(12) United States Patent
Sung et al.

(10) Patent No.: US 7,547,197 B2
(45) Date of Patent: Jun. 16, 2009

(54) DRIVING CONTROLLING APPARATUS FOR LINEAR COMPRESSOR AND METHOD THEREOF

(75) Inventors: Ji-Woon Sung, Seoul (KR); Jae-Yoo Yoo, Gyeonggi-Do (KR); Chel-Woong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 92 days.

(21) Appl. No.: 11/554,700

(22) Filed: Oct. 31, 2006

(65) Prior Publication Data

US 2007/0241697 A1    Oct. 18, 2007

(30) Foreign Application Priority Data

Apr. 14, 2006    (KR) .................. 10-2006-0034310

(51) Int. Cl.
*F04B 49/06*    (2006.01)
(52) U.S. Cl. ................. 417/44.1; 417/45; 417/44.11; 318/778
(58) Field of Classification Search ........... 417/44.1, 417/417, 45, 44.11, 274, 415; 318/778, 785
See application file for complete search history.

(56) References Cited

U.S. PATENT DOCUMENTS

| | | | |
|---|---|---|---|
| 6,002,234 A * | 12/1999 | Ohm et al. | 318/729 |
| 6,623,246 B2 * | 9/2003 | Hwang et al. | 417/44.1 |
| 6,685,438 B2 * | 2/2004 | Yoo et al. | 417/44.11 |
| 6,811,380 B2 * | 11/2004 | Kim | 417/44.1 |
| 6,930,462 B2 | 8/2005 | Yoo et al. | |
| 2004/0071556 A1 | 4/2004 | Sung et al. | |
| 2005/0158178 A1* | 7/2005 | Yoo et al. | 417/45 |
| 2006/0153688 A1 | 7/2006 | Lee et al. | |
| 2006/0228224 A1 | 10/2006 | Hong et al. | |
| 2006/0251523 A1* | 11/2006 | Lee et al. | 417/44.1 |

OTHER PUBLICATIONS

U.S. Appl. No. 11/554,741 to Sung et al., filed on Oct. 31, 2006.

* cited by examiner

*Primary Examiner*—Bentsu Ro
*Assistant Examiner*—Antony M Paul
(74) *Attorney, Agent, or Firm*—Greenblum & Bernstein, P.L.C.

(57) ABSTRACT

A driving controlling apparatus for a linear compressor, comprises a controlling unit for detecting a TDC by a phase difference inflection point between a stoke and a current with increasing the stroke by controlling the current applied to a linear motor, and for varying the current applied to the linear motor based on the detected TDC.

19 Claims, 6 Drawing Sheets

DRIVING CONTROLLING APPARATUS FOR LINEAR COMPRESSOR AND METHOD THEREOF

RELATED APPLICATION

The present disclosure relates to subject matter contained in priority Korean Application No. 10-2006-0034310, filed on Apr. 14, 2006, which is herein expressly incorporated by reference in its entirety.

BACKGROUND OF THE INVENTION

1. Field of the Invention

The present invention relates to a linear compressor, and more particularly, to a driving controlling apparatus for a linear compressor capable of reducing a stroke by increasing a current applied to a linear motor when the stroke is more than a top dead center (TDC), and a method thereof.

2. Description of the Background Art

Generally, a linear compressor reciprocates a piston with using a linear motion of a motor by directly connecting the piston to a mover of a linear motor.

When the linear compressor is applied to a compressor or a refrigerator, a compression ratio of the linear compressor is varied by varying a voltage inputted to the linear compressor thus to control a cooling capacity.

FIG. 1 is a block diagram showing a driving controlling apparatus for a linear compressor in accordance with the related art.

As shown, the driving controlling apparatus for a linear compressor comprises a current detecting unit for detecting a current applied to a motor; a voltage detecting unit 3 for detecting a voltage applied to the motor; a stroke estimating unit 5 for estimating a stroke by the detected current, the detected voltage, and a motor parameter; a comparing unit 1 for comparing the stroke estimation value with a stroke command value thereby outputting a difference value therebetween; and a controlling unit 2 for controlling a stroke by varying a voltage applied to the motor according to the difference value.

An operation of the related art driving controlling apparatus for a linear compressor will be explained.

The current detecting unit 4 detects a current applied to a motor, and a voltage detecting unit 3 detects a voltage applied to the motor.

The stroke estimating unit 5 calculates a stroke estimation value by using the detected current, the detected voltage, and a motor parameter. Then, the stroke estimating unit 5 applies the stroke estimation value to the comparing unit 1.

Then, the comparing unit 1 compares the stroke estimation value with the stroke command value, and applies a difference value therebetween to the controlling unit 2. Then, the controlling unit 2 varies a voltage applied to the motor thus to control a stroke.

As shown in FIG. 2, when the stroke estimation value is greater than the stroke command value, the controlling unit 2 decreases a voltage applied to the motor. On the contrary, when the stroke estimation value is less than the stroke command value, the controlling unit 2 increases a voltage applied to the motor.

The linear compressor obtains a stroke estimation value by using a motor parameter (a), a resistance (R), and a reactance (L), and controls a stroke by using the stroke estimation value.

The related art linear compressor using a stroke voltage controls a voltage by controlling an LC resonance with using a capacitor.

FIG. 3 is a flowchart showing a method for controlling a top dead center (TDC) of the linear compressor in accordance with the related art.

The controlling unit 2 judges whether or not a stroke is a TDC with increasing an input current. When the stroke is the TDC as a result of the judgement, the current applied to the linear motor is maintained.

When the stroke is not the TDC as a result of the judgement, the controlling unit 2 judges whether or not the stroke is less than the TDC. If the stroke is less than the TDC, an input current applied to the linear compressor is increased. On the contrary, if the stroke is more than the TDC, the input current is decreased.

The TDC control is performed by controlling the input current applied to the linear compressor.

However, the related art driving controlling method has the following problems.

First, when the stroke is more than the TDC, a stroke trembling phenomenon occurs even if the input current is decreased or maintained.

Second, when the input current to the linear compressor is decreased, power applied to the linear compressor is greatly increased or decreased thus to vary a cooling capacity. Accordingly, a reliability of the linear compressor is lowered.

SUMMARY OF THE INVENTION

Therefore, an object of the present invention is to provide a driving controlling apparatus for a linear compressor capable of stably controlling a top dead center (TDC) by decreasing a stroke by increasing a current applied to a linear motor when the stroke is more than the TDC, and a method thereof.

To achieve these and other advantages and in accordance with the purpose of the present invention, as embodied and broadly described herein, there is provided a driving controlling apparatus for a linear compressor, comprising: a controlling unit for detecting a TDC by a phase difference inflection point between a stoke and a current with increasing the stroke by controlling the current applied to a linear motor, and outputting a control signal for varying the current applied to the linear motor; a first comparing unit for comparing a current command value with the current applied to the linear motor based on the control signal, and outputting a current compensation signal based on the comparison result; a PWM controlling unit for outputting a PWM control signal for varying the current applied to the linear motor based on the current compensation signal; and an inverter for varying a current applied to the linear motor based on the PWM control signal.

To achieve these and other advantages and in accordance with the purpose of the present invention, as embodied and broadly described herein, there is also provided a driving controlling method for a linear compressor driven with a constant stroke command value, the method comprising: increasing a current applied to a linear motor according to a load thereby increasing a stroke; detecting a TDC by using the current applied to the linear motor and the stroke; and comparing the stroke with the TDC, and varying an input current applied to the linear motor based on the comparison result.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incor- In the drawings.

DETAILED DESCRIPTION OF THE INVENTION

Reference will now be made in detail to the preferred embodiments of the present invention, examples of which are illustrated in the accompanying drawings.

Hereinafter, a driving controlling apparatus for a linear compressor capable of reducing a stroke by increasing a current applied to a linear motor when the stroke is more than a TDC, and a method thereof will be explained with reference to the attached drawings.

Figure 1:
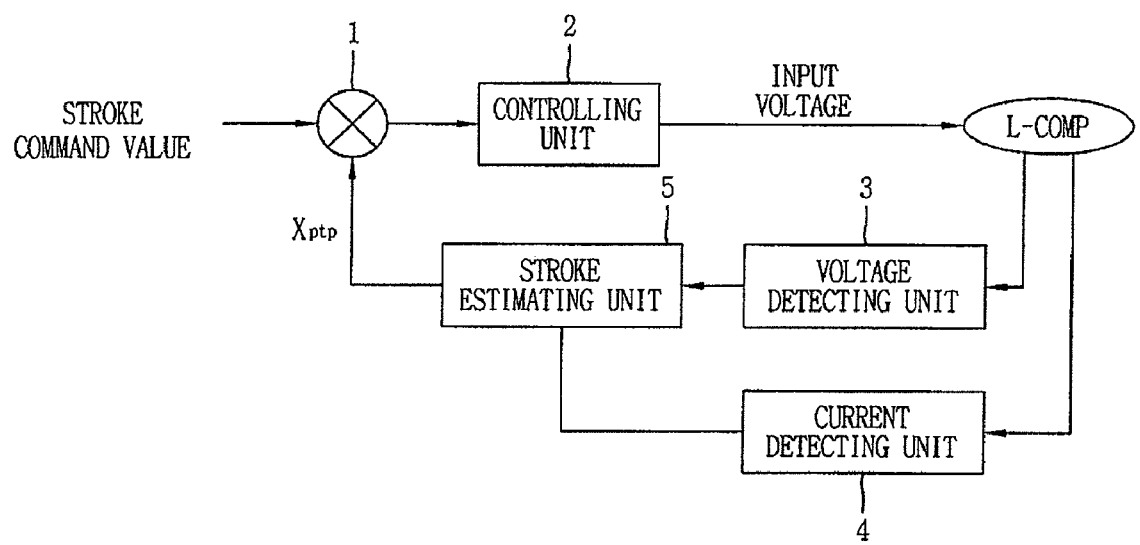
FIG. 1 is a block diagram showing a driving controlling apparatus for a linear compressor in accordance with the related art.
Figure 2:
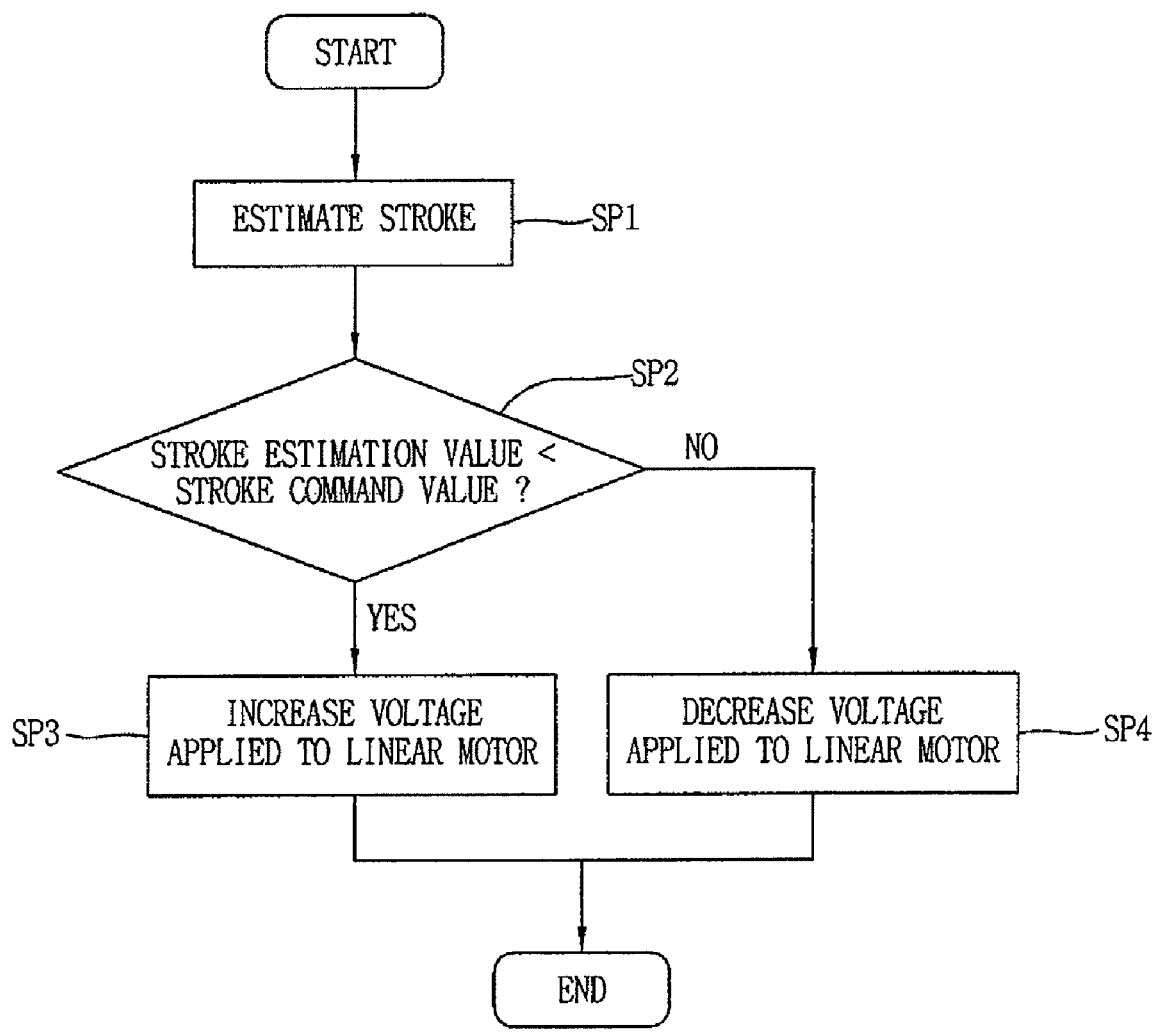
FIG. 2 is a flowchart showing a driving controlling method for a linear compressor in accordance with the related art.
Figure 3:
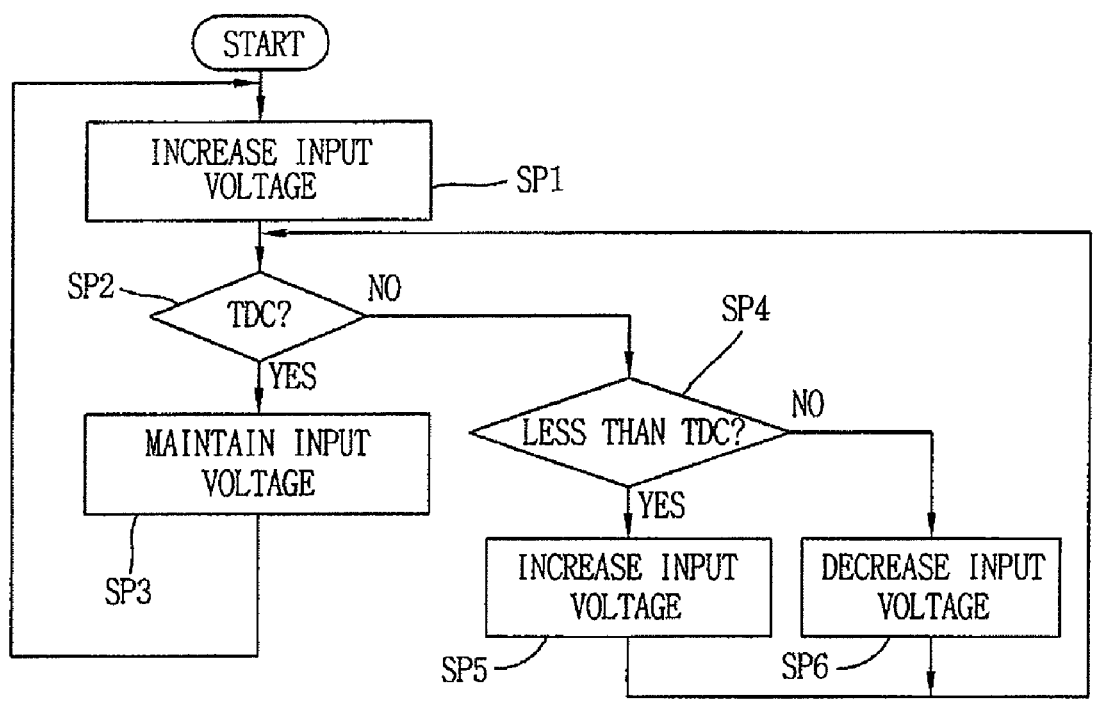
FIG. 3 is a flowchart showing a process for controlling a TDC of a linear compressor in accordance with the related art.
Figure 4:
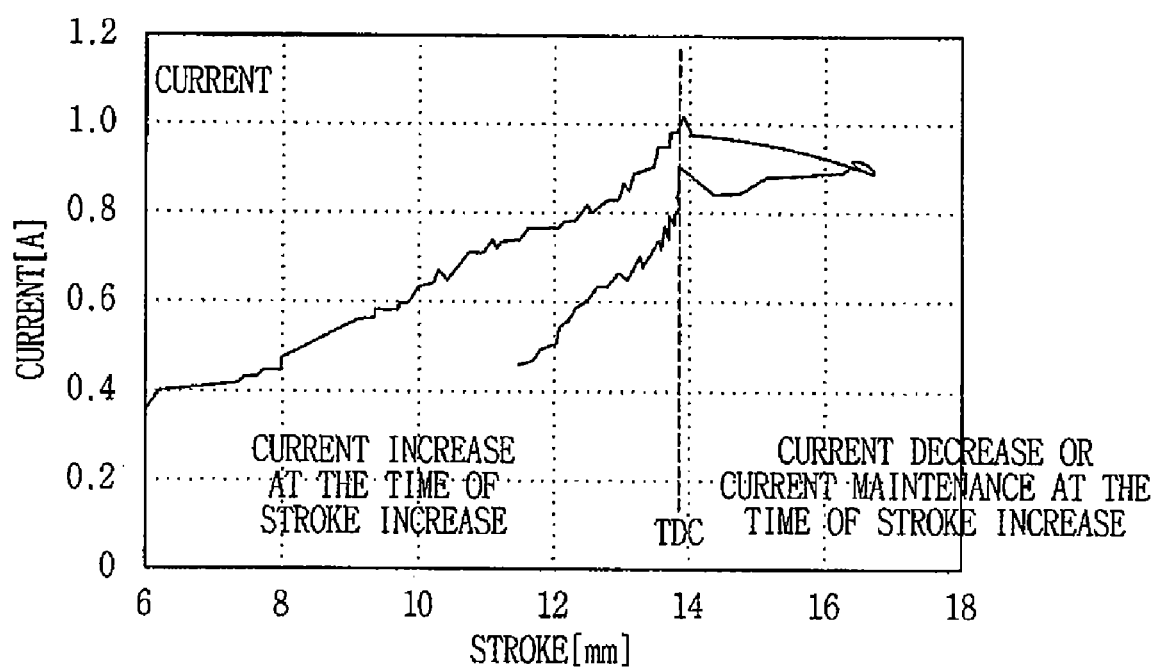
FIG. 4 is a block diagram showing a driving controlling apparatus for a linear compressor according to the present invention.

FIG. 4 is a block diagram showing a driving controlling apparatus for a linear compressor according to the present invention.

As shown, the driving controlling apparatus for a linear compressor according to the present invention comprises a voltage detecting unit 100, a current detecting unit 110, a stroke detecting unit 120, a controlling unit 130, a first comparing unit 160, a second comparing unit 170, a stroke command value determining unit 140, a current command value determining unit 150, a PWM controlling unit 180, an inverter 190, and a power unit 200.

The current detecting unit 110 detects a current of a motor of a linear compressor, and the voltage detecting unit 100 detects a voltage of the motor of the linear compressor.

The stroke detecting unit 120 calculates a stroke by using the detected current and the detected voltage.

The controlling unit 130 detects a TDC by a phase difference inflection point between a stoke and a current with increasing the stroke by controlling the current applied to the linear motor, and varies the current applied to the linear motor.

More concretely, when a stroke is more than a TDC, the controlling unit 130 maintains a current applied to the linear motor. However, when the stroke is less than the TDC, the controlling unit 130 increases the current applied to the linear motor thus to increase the stroke. Also, when the stroke is more than the TDC, the controlling unit 130 increases the current applied to the linear motor thus to decrease the stroke.

The controlling unit 130 may detect the TDC by detecting an inflection point of a damping coefficient applied to a mechanical equation of the linear compressor, or an inflection point of a gas spring constant.

The controlling unit 130 outputs a stroke control signal for varying a stroke command value according to a load.

The stroke command value determining unit 140 determines a stroke command value according to the stroke control signal.

The current command value determining unit 150 determines a current command value according to the stroke control signal.

The first comparing unit 160 compares the stroke command value with the stroke, and outputs a stroke compensation signal based on the comparison result.

The second comparing unit 170 compares the current command value with the current applied to the linear motor in a current control mode, and outputs a current compensation signal based on the comparison result.

The PWM controlling unit 180 outputs a PWM control signal for varying an input current based on the current compensation signal, and outputs a PWM control signal for varying a stroke based on the stroke compensation signal.

The PWM control signal consists of a PWM duty ratio varying signal, and a PWM period varying signal. A current applied to the linear motor is varied according to the PWM duty ratio varying signal.

When the current command value is less than a detected current, the PWM duty ratio is increased. On the contrary, when the current command value is more than the detected current, the PWM duty ratio is decreased.

The inverter 190 varies a current applied to the linear motor according to the PWM control signal.

That is, the inverter 190 is operated accordingly as on/off time of a switching device provided therein is controlled by the PWM control signal, and varies an output current from the power unit 200 thus to apply it to the linear motor.

The power unit 200 rectifies or smoothens a commercial alternating current thus to generate a direct current.

Figure 5:
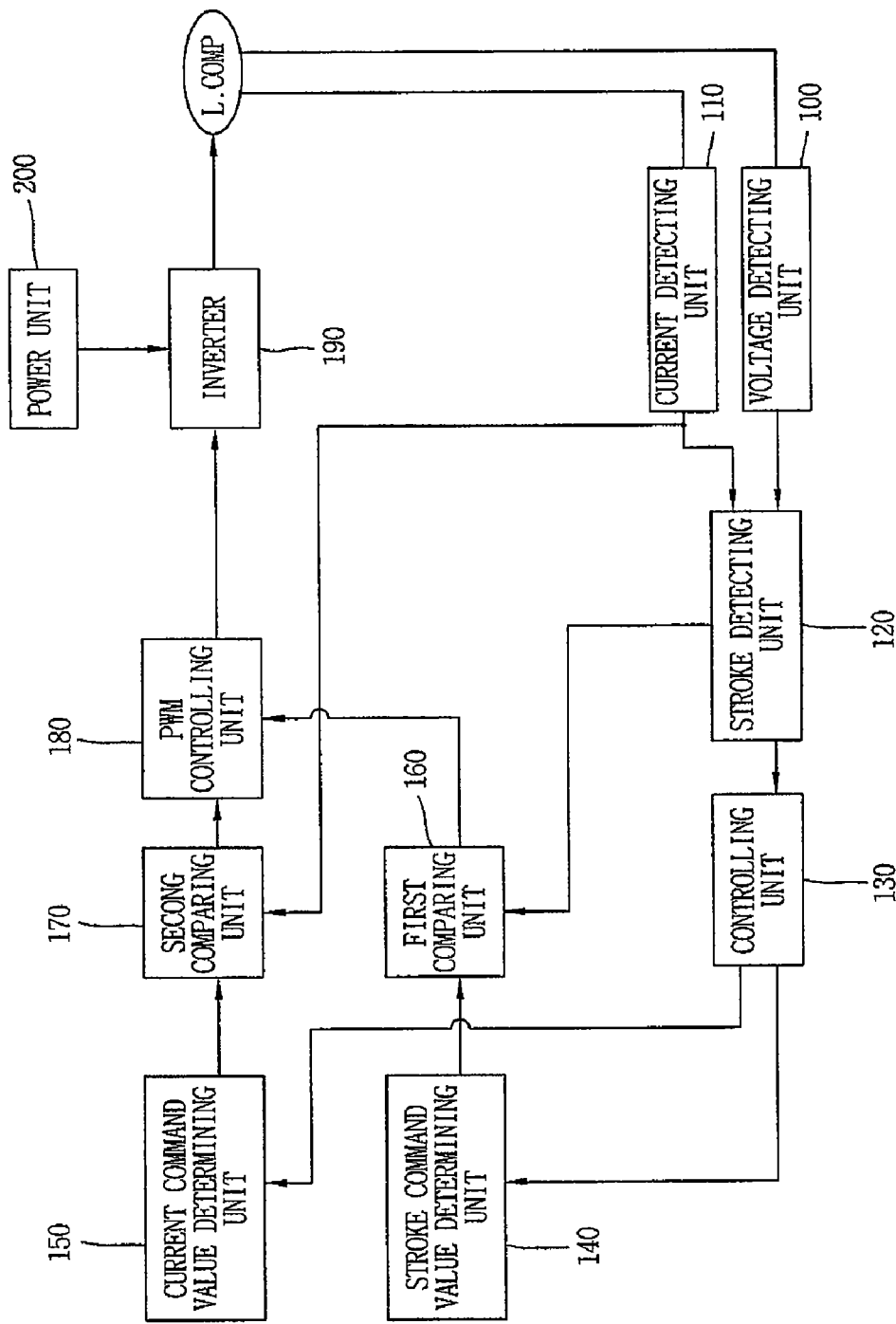
FIG. 5 is a flowchart showing a driving controlling method for a linear compressor according to the present invention.

An operation of the driving controlling apparatus for a linear compressor will be explained with reference to FIG. 5.

It is assumed that the linear compressor is driven with a constant stroke command value.

The current detecting unit 110 detects a current of the motor of the linear compressor, and the voltage detecting unit 100 detects a voltage of the motor of the linear compressor.

The stroke detecting unit 120 calculates a stroke by using the detected current and the detected voltage.

The controlling unit 130 detects a TDC by a phase difference inflection point between a stoke and a current with increasing the stroke by controlling the current applied to a linear motor, and varies the current applied to the linear motor based on the detected TDC (SP11~SP16).

The TDC represents a Top Dead Center point of a piston of the linear compressor, and denotes a stroke when a compression process of the piston is completed.

Since the linear compressor has the most excellent efficiency when the TDC is 0, the piston is controlled so as to be positioned at a point as TDC=0 in the present invention. The point as TDC=0 is referred to as a TDC in the present invention.

The controlling unit 130 increases a current applied to the linear motor according to a load thus to increase a stroke (SP11).

The controlling unit 130 outputs a stroke control signal for varying a stroke command value according to a load.

The stroke command value determining unit 140 determines a stroke command value according to the stroke control signal.

The current command value determining unit 150 determines a current command value according to the stroke control signal.

The first comparing unit 160 compares the stroke command value with the stroke, and outputs a stroke compensation signal based on the comparison result.

The second comparing unit 170 compares the current command value with the current applied to the linear motor, and outputs a current compensation signal based on the comparison result.

The PWM controlling unit 180 outputs a PWM control signal based on the stroke compensation signal and the current compensation signal. The inverter 230 varies a current applied to the linear motor based on the PWM control signal. In a current control mode, the controlling unit 130 increases the current applied to the linear motor (SP11).

The controlling unit 130 judges whether or not a stroke is a TDC (SP12). When the stroke is the TDC as a result of the judgement, the current applied to the linear motor is maintained (SP13).

When the stroke is not the TDC as a result of the judgement, the controlling unit 130 judges whether or not the stroke is less than the TDC (SP14). If the stroke is less than the TDC, the current applied to the linear motor is increased (SP15).

On the contrary, if the stroke is more than the TDC, the current applied to the linear motor is increased thus to decrease the stroke (SP16).

Figure 6:
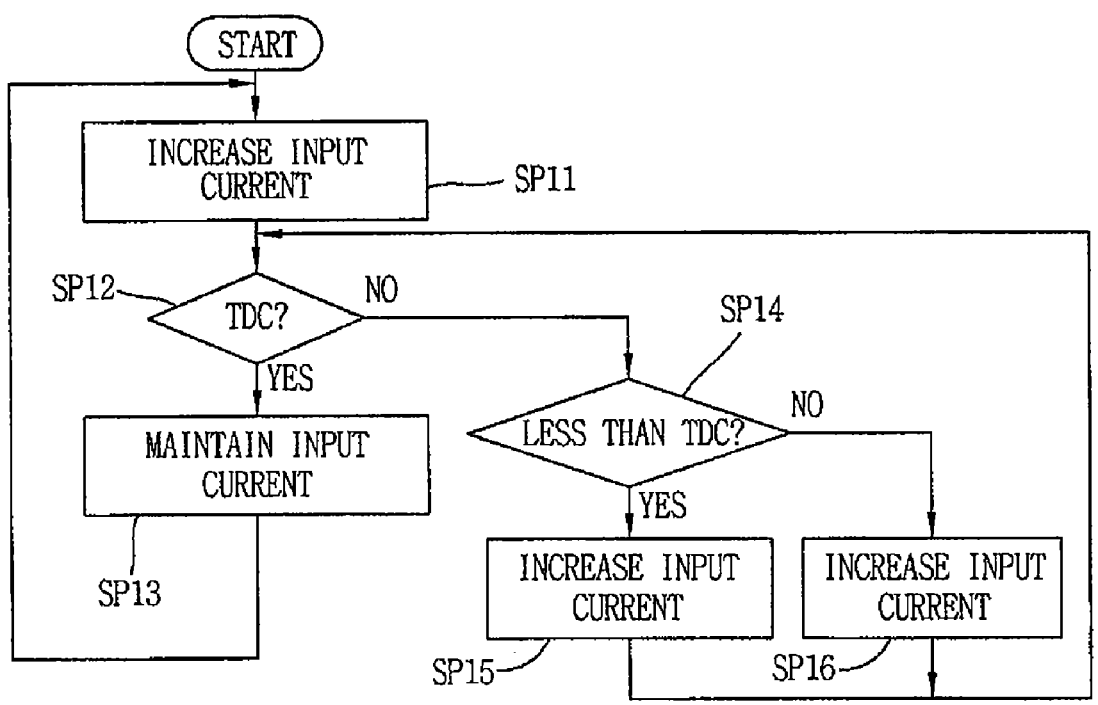
FIG. 6 is a flowchart showing a process for controlling a TDC of a linear compressor according to the present invention.

FIG. 6 is a flowchart showing a process for controlling a TDC of a linear compressor according to the present invention.

In the driving controlling apparatus for a linear compressor according to the present invention, when the stroke is more than the TDC, the current applied to the linear motor is increased thus to decrease the stroke.

In the driving controlling apparatus for a linear compressor according to the present invention, an over stroke more than the TDC is prevented thus to enhance a reliability of the linear compressor.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A driving controlling apparatus for a linear compressor, comprising:
a controlling unit that detects a Top Dead Center (TDC) by a phase difference inflection point between a stoke and a current with increasing the stroke by controlling the current applied to a linear motor, and varying the current applied to the linear motor based on the detected TDC, wherein the controlling unit increases the current applied to the linear motor when the stroke is more than the TDC and thus decreases the stroke.

2. The apparatus of claim 1, wherein the controlling unit maintains the current applied to the linear motor when the stroke is the TDC.

3. The apparatus of claim 1, wherein the controlling unit increases the current applied to the linear motor when the stroke is less than the TDC, and thus increases the stroke.

4. The apparatus of claim 1, further comprising:
a first comparing unit that compares a current command value with the current applied to the linear motor, and outputs a current compensation signal based on the comparison result;
a PWM controlling unit that outputs a PWM control signal that varies the current applied to a the linear motor based on the current compensation signal; and
an inverter that varies the current applied to the linear motor based on the PWM control signal.

5. The apparatus of claim 4, wherein when the current command value is less than the input current, the PWM controlling unit outputs a PWM control signal to increase a PWM duty ratio.

6. The apparatus of claim 4, wherein when the current command value is more than the input current, the PWM controlling unit outputs a PWM control signal to decrease a PWM duty ratio.

7. A driving controlling apparatus for a linear compressor, comprising:
a controlling unit that detects a Top Dead Center (TDC) by a phase difference inflection point between a stoke and a current with increasing the stroke by controlling the current applied to a linear motor, and outputs a control signal that varies the current applied to the linear motor;
first comparing unit that compares a current command value with the current applied to the linear motor based on the control signal, and outputs a current compensation signal based on the comparison result;
PWM controlling unit that outputs a PWM control signal that varies the current applied to the linear motor based on the current compensation signal; and
an inverter that varies the current applied to the linear motor based on the PWM control signal.

8. The apparatus of claim 7, wherein the controlling unit maintains the current applied to the linear motor when the stroke is the TDC.

9. The apparatus of claim 7, wherein the controlling unit increases the current applied to the linear motor when the stroke is less than the TDC, and thus increases the stroke.

10. The apparatus of claim 7, wherein the controlling unit increases the current applied to the linear motor when the stroke is more than the TDC, and thus decreases the stroke.

11. The apparatus of claim 7, wherein the controlling unit outputs a stroke control signal that varies a stroke command value according to a load.

12. The apparatus of claim 7, further comprising:
a stroke command value determining unit that determines a stroke command value based on the stroke control signal; and
a current command value determining unit that determines a current command value based on the stroke control signal.

13. The apparatus of claim 7, further comprising:
a second comparing unit that compares the stroke command value with the stroke, and outputs a stroke compensation signal based on the comparison result.

14. The apparatus of claim 7, wherein the PWM controlling unit outputs a PWM control signal that varies a stroke based on the current compensation signal.

15. The apparatus of claim 7, wherein when the current command value is less than the input current, the PWM controlling unit outputs a PWM control signal to increase a PWM duty ratio.

16. The apparatus of claim 7, wherein when the current command value is more than the input current, the PWM controlling unit outputs a PWM control signal to decrease a PWM duty ratio.

17. A driving controlling apparatus for a linear compressor, comprising:
a controlling unit that detects a Top Dead Center (TDC) by a phase difference inflection point between a stoke and a current with increasing the stroke by controlling the current applied to a linear motor, outputs a control signal that varies the current applied to the linear motor based on the detected TDC, and outputs a stroke control signal that varies a stroke command value according to a load;
a first comparing unit that compares a current command value with the current applied to the linear motor based on the control signal, and outputs a current compensation signal based on the comparison result;
a stroke command value determining unit that determines a stroke command value according to the stroke control signal;
a current command value determining unit that determines a current command value according to the stroke control signal;
a second comparing unit that compares the stroke command value with the stroke, and outputs a stroke compensation signal based on the comparison result;
a PWM controlling unit that outputs a PWM control signal that varies the current applied to the linear motor based on the current compensation signal or the stroke compensation signal; and
an inverter that varies the current applied to the linear motor based on the PWM control signal.

18. A driving controlling method for a linear compressor driven with a constant stroke command value, the method comprising:
increasing a current applied to a linear motor according to a load thereby increasing a stroke;
detecting a Top Dead Center (TDC) by using the current applied to the linear motor and the stroke; and
comparing the stroke with the TDC, and varying the current applied to the linear motor based on the comparison result,
wherein the varying the current comprises decreasing the stroke by increasing the current applied to the linear motor when the stroke is more than the TDC.

19. The method of claim 18, wherein the varying a current further comprises:
maintaining the current applied to the linear motor when the stroke is the TDC; and
increasing the stroke by increasing the current applied to the linear motor when the stroke is less than the TDC.

* * * * *

UNITED STATES PATENT AND TRADEMARK OFFICE
CERTIFICATE OF CORRECTION

PATENT NO. : 7,547,197 B2  
APPLICATION NO. : 11/554700  
DATED : June 16, 2009  
INVENTOR(S) : Ji-Woon Sung et al.

Page 1 of 1

It is certified that error appears in the above-identified patent and that said Letters Patent is hereby corrected as shown below:

At column 6, line 21 (claim 7, line 8) of the printed patent, "first" should be --a first--.
At column 6, line 25 (claim 7, line 12) of the printed patent, "PWM" should be --a PWM--.

Signed and Sealed this

Twentieth Day of October, 2009

David J. Kappos
*Director of the United States Patent and Trademark Office*